US011454977B2

(12) United States Patent
Fujimura et al.

(10) Patent No.: US 11,454,977 B2
(45) Date of Patent: Sep. 27, 2022

(54) INFORMATION PROCESSING METHOD AND INFORMATION PROCESSING DEVICE

(71) Applicant: Panasonic Intellectual Property Corporation of America, Torrance, CA (US)

(72) Inventors: Ryota Fujimura, Kanagawa (JP); Hiroaki Urabe, Osaka (JP); Sotaro Tsukizawa, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 651 days.

(21) Appl. No.: 16/442,908

(22) Filed: Jun. 17, 2019

(65) Prior Publication Data

US 2019/0391588 A1 Dec. 26, 2019

(30) Foreign Application Priority Data

Jun. 21, 2018 (JP) .............................. JP2018-118272

(51) Int. Cl.
*G05D 1/02* (2020.01)
*G06N 20/00* (2019.01)
*G05D 1/00* (2006.01)

(52) U.S. Cl.
CPC ......... *G05D 1/0221* (2013.01); *G05D 1/0088* (2013.01); *G06N 20/00* (2019.01); *G05D 2201/0213* (2013.01)

(58) Field of Classification Search
CPC .............. G05D 1/0221; G05D 1/0088; G05D 2201/0213; G06N 20/00
See application file for complete search history.

(56) References Cited

U.S. PATENT DOCUMENTS 9,725,097 B2 * 8/2017 Oguri ............... G08G 1/096844
10,371,534 B2 * 8/2019 Min ....................... G01C 21/32
(Continued)

FOREIGN PATENT DOCUMENTS

| JP | 6-60050 | 3/1994 |
| JP | 6022447 | 11/2016 |
| WO | 2016/013574 | 1/2016 |

OTHER PUBLICATIONS

Extended European Search Report dated Dec. 4, 2019 in corresponding European Patent Application No. 19177691.3.

*Primary Examiner* — Ramsey Refai
(74) *Attorney, Agent, or Firm* — Wenderoth, Lind & Ponack, L.L.P.

(57) ABSTRACT

An information processing method includes: obtaining, from a mobile object, (i) at least one of operation information of the mobile object and traveling information indicating a traveling route taken by the mobile object, and (ii) sensor data obtained by sensing of the traveling route using a sensor included in the mobile object; causing a learning model to learn, using (i) the at least one of the operation information and the traveling information, and (ii) the sensor data as input, at least one of operation performed on and movement made by the mobile object using the sensor data obtained by sensing of the traveling route; generating, according to a number of times the learning model is trained, presentation information indicating the input required before the learning model completes learning about the traveling route; and causing a presentation device to present the presentation information.

11 Claims, 9 Drawing Sheets

(56) References Cited

U.S. PATENT DOCUMENTS

| | | |
|---|---|---|
| 2013/0085637 A1 | 4/2013 | Grimm et al. |
| 2016/0090099 A1 | 3/2016 | Oguri |
| 2017/0213457 A1 | 7/2017 | Sato |
| 2018/0074497 A1 | 3/2018 | Tsuji et al. |
| 2020/0225668 A1* | 7/2020 | Masuda ............... G05D 1/0214 |

* cited by examiner

INFORMATION PROCESSING METHOD AND INFORMATION PROCESSING DEVICE

CROSS REFERENCE TO RELATED APPLICATION

This application claims the benefit of priority of Japanese Patent Application Number 2018-118272 filed on Jun. 21, 2018, the entire content of which is hereby incorporated by reference.

BACKGROUND

1. Technical Field

The present disclosure relates to information processing method and the like used when causing a learning model to learn operation performed on and/or movement made by a mobile object.

2. Description of the Related Art

Conventionally, a technique for obtaining, in an environment in which no information, such as a map, a destination, and a route for a mobile object to start autonomous driving along a route is provided, information used for the mobile object, such as a vehicle, to autonomously drive along the route using operation, information obtained during manual operation of the mobile object operated by an operator when the mobile object is being driven manually along the route, and sensor information obtained from a sensor included in the mobile object is disclosed (for example, Japanese Patent No. 6022447). Accordingly, even in the environment in which no information for the mobile object to start autonomous driving is provided in advance, it is possible for the mobile object to learn an autonomous-driving route along which the mobile object drives autonomously, and to start autonomous driving.

SUMMARY

When obtaining information used for a mobile object to start autonomous driving using the technique disclosed in Japanese Patent No. 6022447 as mentioned above, there may be difficulties in completing learning about an autonomous-driving route just by using the operation information and the sensor information which are obtained by one-time manual driving of the mobile object along a route. In this case, a user is to repeat manual driving of the mobile object before the autonomous-driving route is determined as an appropriate route for autonomous driving, and to complete the learning. However, it is difficult for the user to learn the learning status, like which route has been learned about and to what degree the route has been learned, while the mobile object is being trained to start autonomous driving along the route.

Consequently, the present disclosure provides an information processing method and the like which enable a user to learn the learning status of a learning model for autonomous driving of a mobile object.

An information processing method according to an aspect of the present disclosure includes: obtaining, from a mobile object, (i) at least one of operation information of the mobile object and traveling information indicating a traveling route taken by the mobile object, and (ii) sensor data obtained by sensing of the traveling route using a sensor included in the mobile object; causing a learning model to learn, using (i) the at least one of the operation information and the traveling information, and (ii) the sensor data as input, at least one of operation performed on and movement made by the mobile object using the sensor data obtained by sensing of the traveling route; generating, according to a number of times the learning model is trained, presentation information indicating the input required before the learning model completes learning about the traveling route; and causing a presentation device to present the presentation information.

Note that these general or specific aspects may be realized by a system, a device, a method, a recording medium, or a computer program, or by optional combination of systems, devices, methods, recording media, or computer programs.

According to an information processing method and the like according to the present disclosure, it is possible for a user to learn the learning status of a learning model for autonomous driving of a mobile object.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

DETAILED DESCRIPTION OF THE EMBODIMENTS

Figure 1:
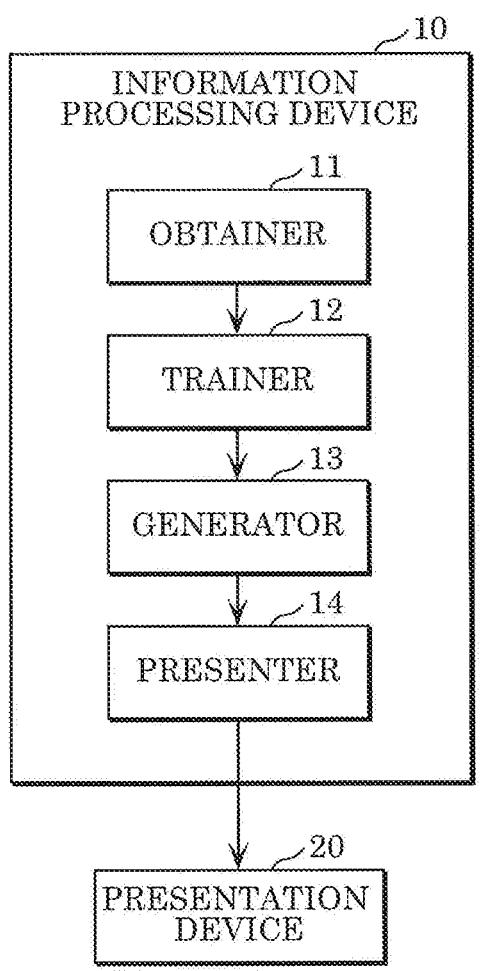
FIG. 1 is a block diagram illustrating an example of a configuration of an information processing device according to an embodiment.

An information processing method according to the present disclosure includes: obtaining, from a mobile object, (i) at least one of operation information of the mobile object and traveling information indicating a traveling route taken by the mobile object, and (ii) sensor data obtained by sensing of the traveling route using a sensor included in the mobile object; causing a learning model to learn, using (i) the at least one of the operation information and the traveling information, and (ii) the sensor data as input, at least one of operation performed on and movement made by the mobile object using the sensor data obtained by sensing of the traveling route; generating, according to a number of times the learning model is trained, presentation information indi- cating the input required before the learning model completes learning about the traveling route; and causing a presentation device to present the presentation information.

The operation information is information on operation of a steering wheel and an accelerator, for example. The traveling information is information indicating a traveling route taken by the mobile object which is obtained from positional information and the like, such as the Global Positioning System (GPS). The sensor data includes, for example, an image that includes surroundings of the mobile object which are captured using a camera included in the mobile object, or point cloud information indicating an object present around the mobile object which is obtained by scanning the object using light detection and ranging (LI-DAR). Accordingly, manual driving of the mobile object along a traveling route allows the learning model to learn, according to surroundings around the mobile object which are indicated by the sensor data, operation to be performed on the mobile object and/or a route to be taken by the mobile object. Since input required before the learning model completes learning about the traveling route (for example, the remaining number of times of manual driving along the traveling route required for the mobile object to drive) is presented according to the number of times the learning model has learned about the traveling route as described above (for example, the number of times a user has driven the mobile object along the traveling route), it is possible for the user to learn the learning status of the learning model for autonomous driving of the mobile object. Consequently, the user is capable of providing input that is effective for the learning.

In addition, the input required before the learning model completes the learning is set higher or not set lower for lower values of the number of times the learning model is trained, and the input required before the learning model completes the learning is set lower for higher values of the number of times the learning model is trained.

Accordingly, it is possible for a user to learn, as the learning status of the learning model, the input required before the learning model completes the learning is not set lower for lower values of the number of times the learning model is trained, and the input required before the learning model completes the learning is set lower for higher values of the number of times the learning model is trained.

In addition, the information processing method according to the present disclosure includes: obtaining, from a mobile object, (i) at least one of operation information of the mobile object and traveling information indicating a traveling route taken by the mobile object, and (ii) sensor data obtained by sensing of the traveling route using a sensor included in the mobile object; causing a learning model to learn, using (i) the at least one of the operation information and the traveling information, and (ii) the sensor data as input, at least one of operation performed on and movement made by the mobile object using the sensor data obtained by sensing of the traveling route; generating, according to variance in at least one of the operation information used for learning the operation performed on the mobile object, the traveling information used for learning the movement made by the mobile object, and the sensor data, presentation information indicating the input required before the learning model completes learning about the traveling route; and causing a presentation device to present the presentation information.

Accordingly, since the input required before the learning model completes learning about a traveling route is presented according to the variance in information on the traveling route (for example, a degree of dispersion of information on operation performed on the mobile object, on a traveling route taken by the mobile object, and/or on surroundings of the mobile object which are obtained each time a user manually drives the mobile object along the traveling route), it is possible for the user to learn the learning status of the learning model for autonomous driving of the mobile object.

In addition, the input required before the learning model completes the learning is set higher or not set lower for higher values of the variance, and the input required before the learning model completes the learning is set lower for lower values of the variance.

Accordingly, it is possible for a user to learn, as the learning status of the learning model, the input required before the learning model completes the learning is not set lower for higher values of the variance, and the input required before the learning model completes the learning is set lower for lower values of the variance.

In addition, when an area in which the variance is greater than or equal to a threshold is present, the presentation information indicating the input required before the learning model completes the learning about the traveling route may be generated according to a degree of adequacy of modeling a relationship between sensor data obtained in the area, and at least one of operation information and traveling information obtained in the area.

When there is an area in which the variance is greater than or equal to a threshold, learning about an autonomous-driving route in the area using the operation information and/or the traveling information, and the sensor data is difficult. The variance which is greater than or equal to the threshold means that there are a large number of cases where the operation information, the traveling information, and/or the sensor data which are obtained by manual driving of the mobile object in the area differ each time the mobile object is being driven manually through the area. In other words, the variance which is greater than or equal to the threshold means the determination of the autonomous-driving route is difficult. On the other hand, the progress of learning about the autonomous driving route can be measured according to whether a relationship between the operation information and/or the traveling information obtained in the area, and the sensor data obtained in the area can be modeled (for example, modeling using linear regression and modeling using cluster analysis), or according to the performance of a model. According to the present disclosure, since input required before the learning model completes learning about the traveling route in the area is presented according to the degree of adequacy of modeling the relationship between the operation information and/or the traveling information obtained in the area, and the sensor data obtained in the area, it is possible for a user to learn the learning status of the learning model for autonomous driving of the mobile object.

In addition, the input required before the learning model completes the learning is set higher or not set lower for lower values of the degree of adequacy of modeling, and the input required before the learning model completes the learning is set lower for higher values of the degree of adequacy of modeling.

Accordingly, it is possible for a user to learn, as the learning status of the learning model, the input required before the learning model completes the learning is not set lower for lower values of the degree of adequacy of modeling, and the input required before the learning model completes the learning is set lower for higher values of the degree of adequacy of modeling.

Furthermore, a user different from a user of the mobile object may be provided with the presentation information.

Accordingly, it is possible to notify the learning status of the mobile object to a user of another mobile object for autonomous driving of the other mobile object.

In addition, the learning model may be caused to learn, when the leaning is not completed, at least one of operation performed on and movement made by the mobile object, using at least one of operation information and traveling information of another mobile object different from the mobile object, and sensor data obtained by the other mobile object different from the mobile object as input. For example, according to similarity between the input used for the mobile object and the input used for the other mobile object, input to be used for training the learning model may be determined from among the input used for the other mobile object.

Accordingly, it is possible for a mobile object to be trained to learn using input, that is, the operation information and/or the traveling information used for another mobile object, and the sensor data used for the other mobile object. More specifically, by using input among the input used for the other mobile object which has close similarity with the input used for the mobile object to be trained, the input to be provided by a user can be set low. Also, the input required before the learning model completes the learning which is presented is set low.

In addition, an information processing device according to the present disclosure includes a processor. The processor obtains, from a mobile object, (i) at least one of operation information of the mobile object and traveling information indicating a traveling route taken by the mobile object, and (ii) sensor data obtained by sensing of the traveling route using a sensor included in the mobile object, causes a learning model to learn, using (i) the at least one of the operation information and the traveling information, and (ii) the sensor data as input, at least one of operation performed on and movement made by the mobile object using the sensor data obtained by sensing of the traveling route, generates, according to a number of times the learning model is trained, presentation information indicating the input required before the learning model completes learning about the traveling route, and causes a presentation device to present the presentation information.

Accordingly, it is possible to provide an information processing device that enables a user to learn the learning status of the learning model for autonomous driving of the mobile object.

In addition, an information processing device according to the present disclosure includes a processor. The processor obtains, from a mobile object, (i) at least one of operation information of the mobile object and traveling information indicating a traveling route taken by the mobile object, and (ii) sensor data obtained by sensing of the traveling route using a sensor included in the mobile object, causes a learning model to learn, using (i) the at least one of the operation information and the traveling information, and (ii) the sensor data as input, at least one of operation performed on and movement made by the mobile object using the sensor data obtained by sensing of the traveling route, generates, according to variance in at least one of the operation information used for learning the operation performed on the mobile object, the traveling information used for learning the movement made by the mobile object, and the sensor data, presentation information indicating the input required before the learning model completes learning about the traveling route, and causes a presentation device to present the presentation information.

Accordingly, it is possible to provide an information processing device that enables a user to learn the learning status of the learning model for autonomous driving of the mobile object.

Hereinafter, embodiments will be described in detail with reference to the drawings.

Note that the embodiments below each describe a general or specific example. The numerical values, shapes, structural elements, the arrangement and connection of the structural elements, steps, and the processing order of the steps, etc. presented in the embodiments below are mere examples and do not limit the present disclosure. Furthermore, among the structural elements in the embodiments below, those not recited in any one of the independent claims representing the most generic concepts will be described as optional structural elements.

Embodiment

Hereinafter, an embodiment will be described with reference to FIG. 1 through FIG. 9.

[1. Configuration of Information Processing Device]

FIG. 1 is a block diagram illustrating an example of a configuration of information processing device 10 according to an embodiment. Note that presentation device 20 which presents information generated in information processing device 10 is also illustrated in FIG. 1.

Information processing device 10 is a device used when causing a learning model to learn at least one of operation performed on and movement made by a mobile object. Note that the expression, at least one of operation performed on and movement made by a mobile object means operation performed on the mobile object, movement made by the mobile object, and the combination of the operation performed on the mobile object and the movement made by the mobile object, which can be expressed as the operation performed on the mobile object and/or the movement made by the mobile object. Information processing device 10 may be a device included in the mobile object, or may be a server device wirelessly connected with the mobile object, for example. That is to say, the learning may be performed by the mobile object or by the server device to which information from the mobile object is transmitted. When information processing device 10 is the device included in the mobile object, information processing device 10 may be realized by, for example, an electronic control unit (ECU) or a car-navigation system.

Presentation device 20 is, for example, a display device (for example, a display) or speech output device (for example, a speaker) which is included in the mobile object. In addition, when augmented reality (AR) which will be described later is used, presentation device 20 may be a windshield of the mobile object or a device that projects an image to the windshield. Note that presentation device 20 may be a mobile device (for example, a smart phone or a tablet) owned by a driver who operates the mobile object, that is, a user.

Information processing device 10 includes obtainer 11, trainer 12, generator 13, and presenter 14.

Information processing device 10 is a device that includes, for example, a processor (for example, a microprocessor) and memories, such as a digital circuit, an analog circuit, and a communication circuit. The memories are, for example, a read-only memory (ROM) and a random-access memory (RAM), and the memories can store a control program executed by the processor, or in other words, a computer program. For example, when the processor operates according to the control program, information processing device 10 realizes each of functions, that is, obtainer 11, trainer 12, generator 13, and presenter 14.

[2. Operation of Information Processing Device]

Operations of obtainer 11, trainer 12, generator 13, and presenter 14 will be described with reference to FIG. 2.

Figure 2:
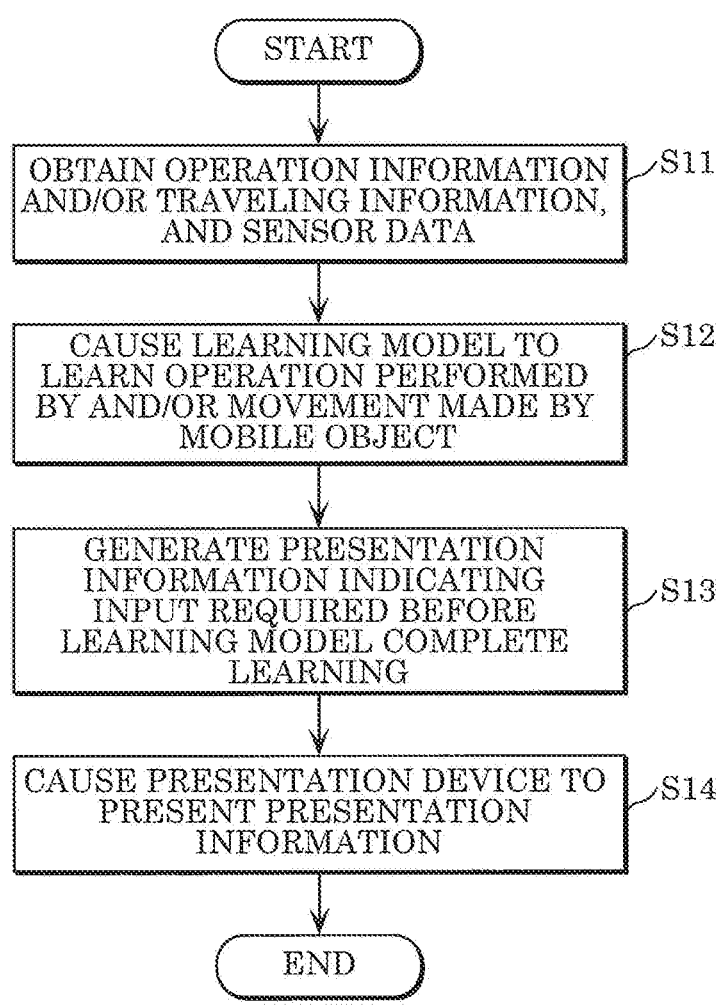
FIG. 2 is a flowchart illustrating an example of operation of the information processing device according to the embodiment.

FIG. 2 is a flowchart illustrating an example of operation of information processing device 10 according to the embodiment.

First, obtainer 11 obtains, from the mobile object, at least one of the operation information of the mobile object and the traveling information indicating a traveling route taken by the mobile object, and the sensor data obtained by sensing of the traveling route using a sensor included in the mobile object (step S11). Note that the expression, at least one of the operation information of the mobile object and the traveling information indicating a traveling route taken by the mobile object means the operation information of the mobile object, the travelling information indicating a traveling route taken by the mobile object, and the combination of the operation information of the mobile object and the traveling information indicating a traveling route taken by the mobile object, which can be expressed as the operation information of the mobile object and/or the traveling information indicating a traveling route taken by the mobile object. Me operation information is information on handle operation, or in other words, steering wheel operation operated by a user who operates the mobile object, and accelerator and brake operation operated by the user who operates the mobile object. More specifically, the operation information is information that indicates a steering angle of a steering wheel of the mobile object and a start and a stop of the mobile object. The traveling information is information that indicates, for example, a traveling route taken by the mobile object, and obtained from positional information, such as the GPS. More specifically, the traveling information is information that indicates a traveling route derived from the positional information that changes according to time. The sensor data includes, for example, an image that includes surroundings of the mobile object which are captured using a camera included in the mobile object, or point cloud information that indicates an object around the mobile object obtained by scanning the object using the LIDAR. More specifically, the sensor data is information that indicates, for example, a building, a roadside tree, a traffic light, and another mobile object.

Next, trainer 12 causes the learning model to learn, using the operation information and/or the traveling information, and the sensor data as input, operation performed on and/or movement made by the mobile object using the sensor data obtained by sensing of a traveling route (step S12). For example, trainer 12 stores (i) operation performed on the mobile object while the mobile object is being driven manually along the traveling route, which is indicated by the operation information that is obtained by the mobile object being driven manually along the traveling route, and (ii) surroundings of the mobile object at the time when the operation is performed, which is indicated by the sensor data that is obtained by the mobile object being driven manually along the traveling route, in association with each other. More specifically, trainer 12 stores information, like the steering wheel is turned to the right, or in other words, the mobile object made a right turn, the mobile object that has been stationary is started to move, and the mobile object that has been moving comes to rest, when the mobile object is surrounded by certain surroundings. Or trainer 12 stores (i) positions of the mobile object which ceaselessly change while the mobile object is being driven manually along the traveling route, and (ii) surroundings of the mobile object in each of the positions, in association with each other. Accordingly, trainer 12 can cause the learning model to learn, according to surroundings around the mobile object which are indicated by the sensor data, operation to be performed on the mobile object and/or a route to be taken by the mobile object. Consequently, by inputting the sensor data, which is obtained while the mobile object is traveling along a traveling road about which the learning model has completed learning, to the learning model which has completed learning about the traveling route, operation performed on the mobile object and/or movement made by the mobile object which corresponds to the sensor data is outputted, and thus the mobile object is allowed to drive autonomously according to the operation and/or the movement.

Here, in the case of obtaining information to be used for the mobile object to start autonomous driving, it is difficult for the learning model to complete learning about the traveling route by using operation information and/or traveling information, and sensor data which are obtained by the mobile object being driven along the traveling route only once. For this reason, the user is required to repeat manual driving of the mobile object along the travelling route before the learning model completes learning about the traveling route. If the user is able to learn, at this time, the learning status of the learning model for the mobile object to drive autonomously, the learning can be proceeded effectively.

Therefore, generator 13 generates, according to the number of times the learning model is trained or according to variance in at least one of the operation information used for learning operation performed on the mobile object, the traveling information used for learning movement made by the mobile object, and the sensor data, presentation information indicating the input required before the learning model completes learning about the traveling route (step S13). The number of times the learning model is trained indicates, for example, the number of times the operation information and/or the traveling information on the traveling route, and the sensor data on the traveling route are obtained by the learning model. More specifically, the number of times the learning model is trained indicates the number of times a user has manually driven the mobile object along the traveling route. The variance indicates a degree of dispersion of information on operation performed on the mobile object, on a traveling route taken by the mobile object, and/or on surroundings of the mobile object, which are obtained each time the user manually drives the mobile object along the traveling route, for example. In addition, the traveling route is, for example, a route from a place of departure to a destination. For example, the place of departure is a point where the mobile object starts moving from a state in which the mobile object is being completely stationary, and the destination is the point where the mobile object comes to rest completely from a state in which the mobile object is moving. Note that the traveling route is not limited to how it is described above. For example, the traveling route may be divided into sections, and a sectioned route from an intersection to a next intersection can be the traveling route. In this case, the intersections are the place of departure and the destination of the sectioned traveling route. In addition, the input required before the learning model completes learning about the traveling route indicates the number of times the operation information and/or the traveling information, and the sensor data required before the learning model completes learning about the traveling route are input. More specifically, the input required before the learning model completes learning about the traveling route indicates the number of times the user is required to manually drive the mobile object along the traveling route. Details of operation performed by generator 13 will be described later with reference to FIG. 3 through FIG. 5.

Presenter 14 causes presentation device 20 to present presentation information (step S14). Specific examples of the presentation information will be described later with reference to FIG. 6 through FIG. 9.

[3. Generation of Presentation Information]

Next, details of operation performed by generator 13 will be described. Here, example 1 through example 3 will be provided as specific examples for describing methods of generating presentation information.

First, example 1 will be described.

Figure 3:
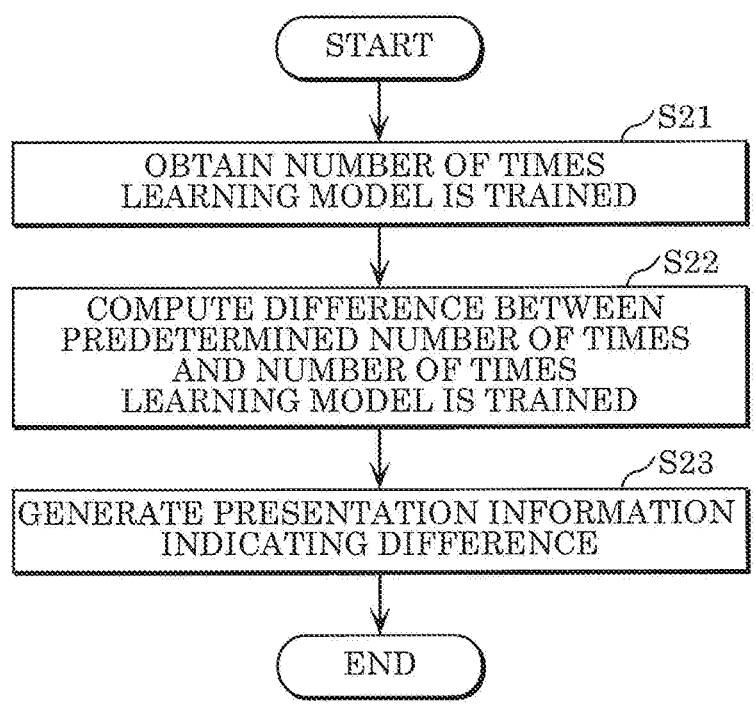
FIG. 3 is a flowchart illustrating example 1 of a method of generating presentation information according to the embodiment.

FIG. 3 is a flowchart illustrating example 1 of a method of generating presentation information according to the embodiment.

Generator 13 obtains the number of times the learning model has learned about a traveling route (Step S21). For example, when a user has manually driven the mobile object along the traveling route once, generator 13 obtains "one time" as the number of times the learning model is trained.

Next, generator 13 computes a difference between the predetermined number of times required for the learning model to be trained and the obtained number of times the learning model is trained (step S22). The predetermined number of times required for the learning model to be trained may be, for example, the fixed value that is preset. In addition, for example, since the length of the traveling route is computable by the mobile object being driven manually along the traveling route once, the predetermined number of times required for the learning model to be trained may be determined according to the length. Furthermore, for example, since the level of difficulty of driving the traveling route is computable by the mobile object being driven manually along the traveling route once, the predetermined number of times required for the learning model to be trained may be determined according to the level of difficulty. The level of difficulty is con based on, for example, a volume of traffic of the traveling route and/or the number of passers-by in the traveling route which can be estimated from the sensor data, for example.

Then, generator 13 generates the presentation information which indicates the difference as input required before the learning model completes the learning (step S23). For example, when the predetermined number of times required for the learning model to learn about the traveling route is five times, the presentation information indicates, as the input required before the learning model completes learning about the traveling route, four times when the number of times the learning model has learned about the traveling route is one time, and three times when the number of times the learning model has learned about the traveling route is two times. The presentation information indicates that the learning about the traveling route is completed when the number of times that the learning model has learned about the traveling route reaches five times that is the same number as the predetermined number of times required for the learning model to learn about the traveling route. That is to say, the input required before the learning model completes the learning is set lower for higher values of the number of times the learning model is trained. In other words, the input required before the learning model completes the learning is not set lower for lower values of the number of times the learning model is trained (for example, when no training is performed). Note that the input, required before the learning model completes the learning may be set higher for lower values of the number of times the learning model is trained.

Next, example 2 will be described.

Figure 4:
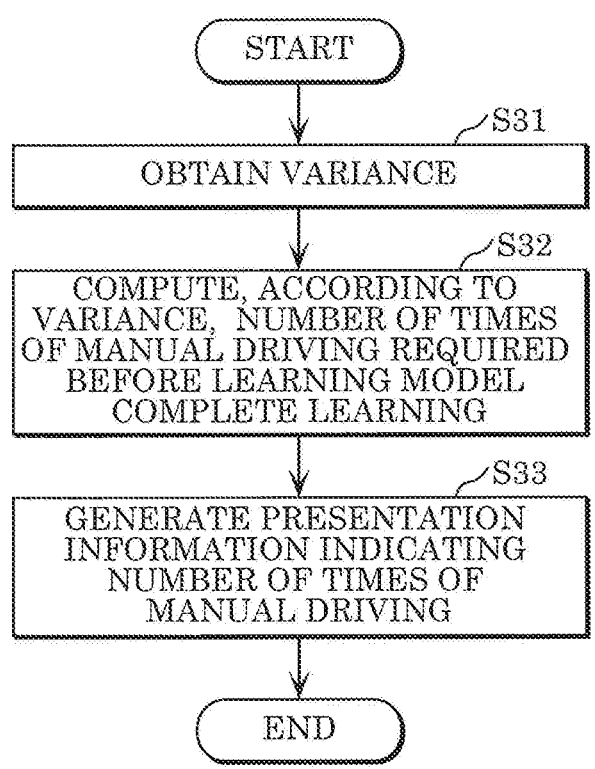
FIG. 4 is a flowchart illustrating example 2 of the method of generating the presentation information according to the embodiment.
Figure 5:
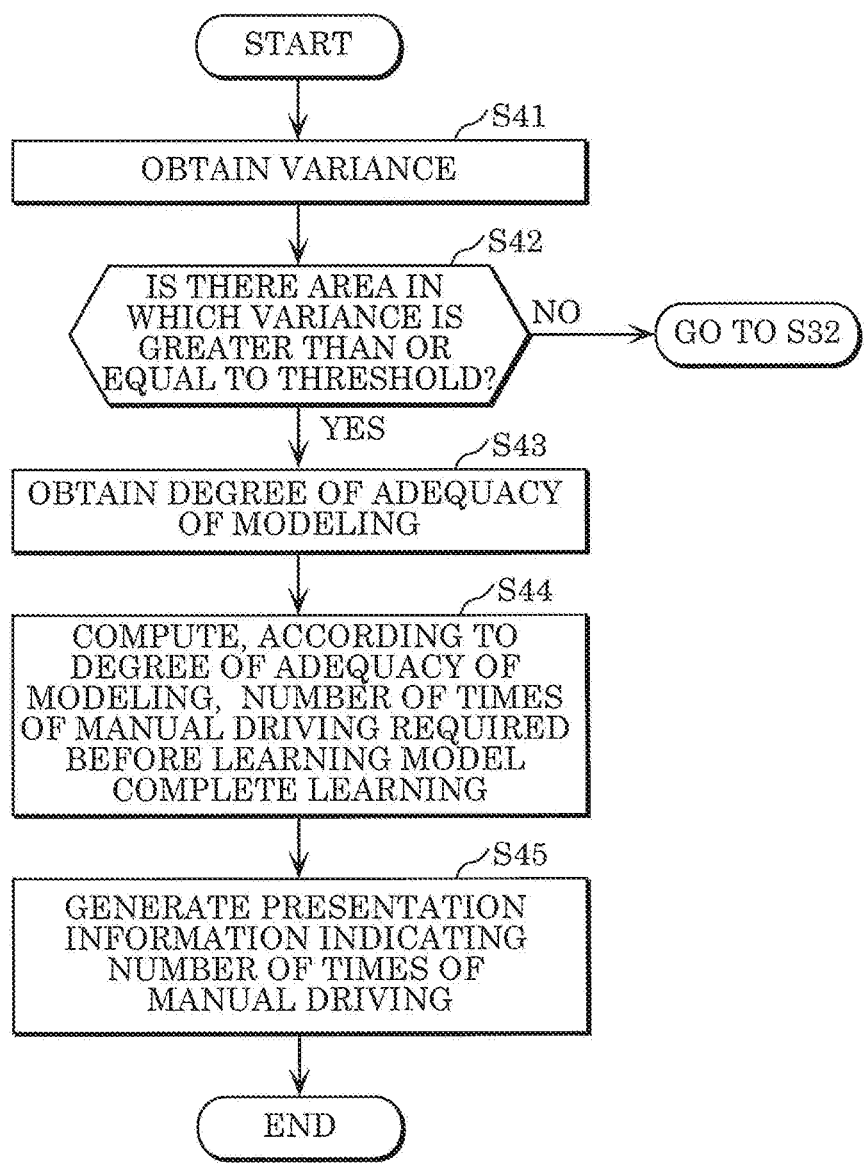
FIG. 5 is a flowchart illustrating example 3 of the method of generating the presentation information according to the embodiment.

FIG. 4 is a flowchart illustrating example 2 of the method of generating the presentation information according to the embodiment.

Generator 13 obtains variance in at least one of the operation information, the traveling information, and the sensor data which are used for the learning model to learn about a traveling route (step S31). For example, generator 13 obtains a degree of dispersion of information on operation performed on the mobile object which is indicated by the operation information and/or on a traveling route indicated by the traveling information which is obtained each time a user manually drives the mobile object along the traveling route, and surroundings indicated by the sensor data which is obtained each time the user manually drives the mobile object along the traveling route. For example, when there are differences in the information obtained each time the user manually drives the mobile object along the traveling route, the variance will be high. More specifically, the variance will be high when there are differences in steering angles of a steering wheel, in traveling routes, and/or in surroundings, each time the mobile object is being driven manually along the traveling route. A cause of this high variance is that there are a great number of mobile obstructions present in the traveling route (for example, many vehicles parked on a street and heavy traffic). The variance is expressed with, for example, a numerical value or a plurality of levels.

Next, generator 13 computes, according to the variance, the number of times of manual driving of the mobile object required before the learning model completes the learning (step S32). For example, in example 1 described above, the predetermined number of times required for the learning model to be trained is determined according to the level of difficulty for the mobile object to be driven along a traveling route, but in example 2, the variance corresponds to the level of difficulty. For example, when the variance is high, the predetermined number of times required for the learning model to be trained is set high, because the level of difficulty is high. That is to say, the difference between the predetermined number of times required for the learning model to be trained and the number of times the learning model is trained, or in other words, the number of times of manual driving of the mobile object required before the learning model completes the learning is set high. Consequently, when the variance is high, generator 13 computes a high number of times of the manual driving, according to the high variance. On the other hand, when the variance is low, the predetermined number of times required for the learning model to be trained is set low because the level of difficulty is low. That is to say, the difference between the predetermined number of times required for the learning model to be trained and the number of times the learning model is trained, or in other words, the number of times of manual driving of the mobile object required before the learning model completes learning about the traveling route is set low. Consequently, when the variance is low, generator 13 computes, according to the low variance, a low number of times of manual driving of the mobile object. As such, the input required before the learning model completes the learning is set higher for higher values of the variance, and the input required before the learning model completes the learning is set lower for lower values of the variance. Note that the input required before the learning model completes the learning need not be set low, that is, the predetermined number of times required for the learning model to be trained need not be set low.

Then, generator 13 generates, as the input required before the learning model completes the learning, presentation information that indicates the number of times of manual driving of the mobile object which is computed according to the variance (step S33).

Next, example 3 will be described.

Generator 13 obtains variance in the operation information and/or the traveling information used for the learning model to learn about a traveling route, and the sensor data used for the learning model to learn about the traveling route (step S41). Since processing described in step S41 is the same processing described in step S31, descriptions of step S41 will be omitted.

Next, generator 13 determines whether there is an area in which the variance is greater than or equal to a threshold (step S42). The threshold is a value that is preset, for example, and which corresponds to the variance obtained when the level of difficulty for the mobile object to be driven along the traveling route is high.

When generator 13 determines that there is no area in which the variance is greater than or equal to the threshold (NO in step S42), the processes after step S32 in example 2 are to be performed. That is to say, generator 13 computes, according to the variance that is less than the threshold, the number of times of manual driving of the mobile object required before the learning model completes learning about the traveling route, and generates the presentation information that indicates the number of times of the manual driving.

When generator 13 determines that there is an area in which the variance is greater than or equal to the threshold (YES in step S42), generator 13 obtains the degree of adequacy of modeling a relationship between the operation information and/or the traveling information obtained in the area, and sensor data obtained in the area (step S43). The relationship between the operation information and/or the traveling information, and the sensor data indicates, for example, a relationship between the sensor data that indicates a situation where vehicles which are parked on a street are present around the mobile object, and the operation information that indicates, for example, handle operation and accelerator and brake operation to be performed in the situation (for example, operation to avoid the vehicles), and/or information on a route to be taken in the situation (for example, a route to avoid the vehicles). That is to say, generator 13 obtains, using results of object detection as explanatory variables, the degree of adequacy of modeling as to whether how the handle operation, the accelerator and brake operation, and the selection of a route are to be performed or not. The degree of adequacy of modeling is, for example, the degree of linear regression modeling, or ease of modeling using cluster analysis. More specifically, the degree of adequacy of modeling may be accuracy or precision of the performance of a model, that is, the output of the model. For example, when such modeling is possible, it can be said that the degree of adequacy of modeling is high. In addition, for example, when it is possible to classify the operation information and/or the traveling information obtained by manual driving of the mobile object several times along the traveling route into a plurality of clusters such that similar pieces of information belong to the same cluster, and to compute the variance in each cluster, it can be said that the degree of adequacy of modeling is high because modeling using the cluster analysis is made easy. On the other hand, when a cause for a change in the handle operation, in the accelerator and brake operation, or in the selection of the route cannot be found, or when there are no differences found between pieces of information in the same cluster when classified into the plurality of clusters, and thus the variance cannot be computed, it can be said that the degree of adequacy of modeling is low. The degree of adequacy of modeling is expressed with, for example, a numerical value or a plurality of levels.

Next, generator 13 computes the number of times of manual driving of the mobile object required before the learning model completes the learning, according to the degree of adequacy of modeling (step S44). For example, since the level of difficulty is high for the mobile object to be driven along the traveling route in an area in which the variance is greater than or equal to the threshold, the predetermined number of times required for the learning model to be trained, which is described in example 1 above, is set high. That is to say, the number of times of manual driving of the mobile object required before the learning model completes learning can be set high. However, when the degree of adequacy of modeling is high, the above predetermined number of times required for the learning model to be trained can be set low, since the mobile object can be driven accurately, using the model, along the traveling route of which the level of difficulty is high. That is to say, a low number of times of manual driving of the mobile object required before the learning model completes learning is computed. On the other hand, when the degree of adequacy of modeling is low, the above predetermined number of times required for the learning model to be trained is set high, since there is no model that allows the mobile object to be driven accurately along the traveling route of which the level of difficulty is high. That is to say, a high number of times of manual driving of the mobile object required before the learning model completes learning is computed. As such, the input required before the learning model completes the learning is set higher for lower values of the degree of adequacy of modeling, and the input required before the learning model completes the learning is set lower for higher values of the degree of adequacy of modeling. Note that the input required before the learning model completes the learning is not set lower for lower values, of the degree of adequacy of modeling, that is, the predetermined number of times required for the learning model to be trained need not be set low.

Next, generator 13 generates, as the input required before the learning model completes the learning, the presentation information that indicates the number of times of manual driving of the mobile object required before the learning model completes the learning which is computed according to the degree of adequacy of modeling (step S45).

As such, the presentation information that indicates the input required before the learning model completes the learning is generated.

Note that the learning performed by the learning model indicates the learning of operation performed on the mobile object and/or movement made by the mobile object on a traveling route, and a main objective of the learning is autonomous driving of the mobile object, for example. For this reason, the learning may be performed without considering the comfortableness of an occupant in the mobile object during autonomous driving of the mobile object. More specifically, during the autonomous driving, a route that may make the occupant feel unpleasant due to, for example, vibration and many right and left turns may be selected.

Accordingly, learning for the occupant to stay comfortable during autonomous driving may be performed. In this case, since the learning may be performed in consideration of the occupant in the mobile object to be comfortable during the autonomous driving, input required before the learning model completes the learning is set high. For example, since the learning is performed using sensor data that includes results of sensing of an acceleration sensor and the like, the level of difficulty of the learning will be high.

[4. Specific Example of Presentation Information]

Next, example 1 through example 3 will be provided as specific examples for describing presentation information that is presented using presentation device 20. First, example 1 and example 2 of the presentation information presented when the mobile object is driven manually, as illustrated in FIG. 6, will be described.

Figure 6:
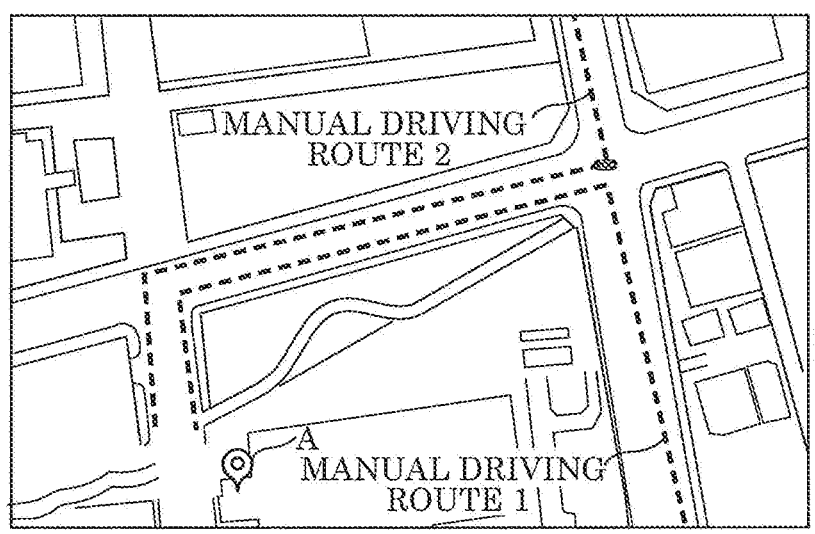
FIG. 6 is a diagram illustrating examples of routes along which a mobile object has been driven manually.

FIG. 6 is a diagram illustrating examples of routes along which the mobile object has been driven manually. As illustrated in FIG. 6, suppose that the mobile object has been driven manually toward destination A, along manual driving route 1 and manual driving route 2 each of which is illustrated with a dashed line. Manual driving route 1 is a route which the mobile object arrives destination A by going north, turning left at the intersection, and turning left at the T junction. Manual driving route 2 is a route which the mobile object arrives destination A by going south, turning right at the intersection, and turning left at the T junction.

Figure 7:
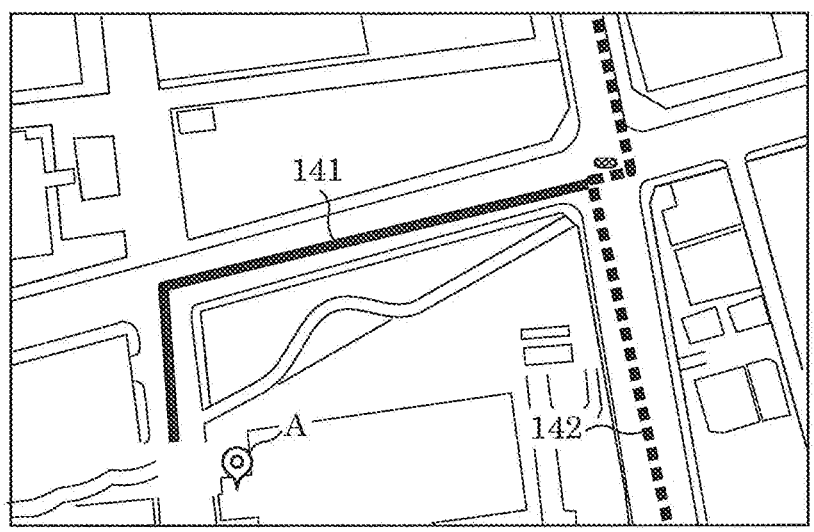
FIG. 7 is a diagram illustrating example 1 of the presentation information.

FIG. 7 is a diagram illustrating example 1 of the presentation information. In example 1, the presentation information is represented as colored lines superimposed on routes in the map which is displayed on presentation device 20 that is a display, for example. Note that the map may be a two-dimensional map, that is, a planimetric map, and may be a three-dimensional map, that is, a topographical map. For example, colors of the colored lines indicate the learning status of the learning model, and the input required before the learning model completes the learning is predetermined according to the colors. For example, a traveling route on which an orange line is superimposed indicates that the number of times of manual driving of the mobile object required before the learning model completes learning about the traveling route is three times, and a traveling route on which a blue line is superimposed indicates that the learning model has completed learning about the traveling route.

Presentation information 141 indicated by the solid line in FIG. 7 is, for example, a blue line superimposed on a route in the map, and indicates that the learning model has completed the learning. As illustrated in FIG. 6, since the traveling route from the intersection to destination A has been manually driven by the mobile object multiple times as manual driving routes 1 and 2 indicate, it is determined that another manual driving of the mobile object is unnecessary. Presentation information 142 indicated by the dashed line in FIG. 7 is, for example, an orange line superimposed on a route in the map, and indicates that the number of times of manual driving of the mobile object required before the learning model completes the learning is three times. As illustrated in FIG. 6, since the traveling route from the south to the intersection and the traveling route from the north to the intersection each has been manually driven by the mobile object only once, it is determined that another manual driving is necessary.

As such, the presentation information may be a colored line which is superimposed on a route in a map. Note that the presentation information may be superimposed, not only on a route in the map, but on, for example, obstructions, such as a building and a road side tree.

Figure 8:
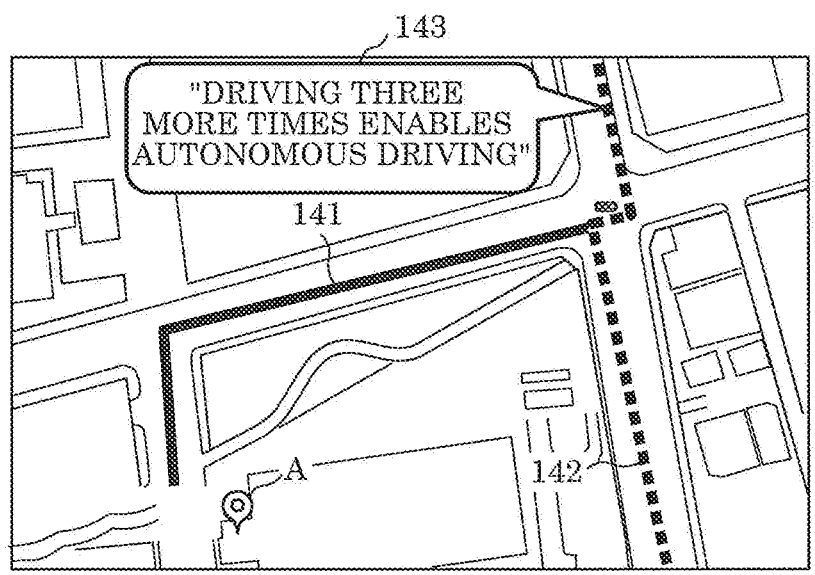
FIG. 8 is a diagram illustrating example 2 of the presentation information.

FIG. 8 is a diagram illustrating example 2 of the presentation information. In example 2, the presentation information is a text superimposed near a route in a map which is displayed on presentation device 20 that is a display, for example. As illustrated in FIG. 8, presentation information 143 indicates the input required before the learning model completes learning about the route according to presentation information 142 by displaying the text "Driving three more times enables autonomous driving".

As such, the presentation information may be a text which is superimposed near a route in the map. Note that in example 2, the presentation information includes presentation information 141 and 142, but the presentation information need not include presentation information 141 and 142. That is to say, there may be only presentation information 143 superimposed within the map.

In example 1 and example 2, the presentation information is information superimposed within a map, but the presentation information is not limited to this. For example, the presentation information may be presented using the AR. This will be described with reference to FIG. 9.

Figure 9:
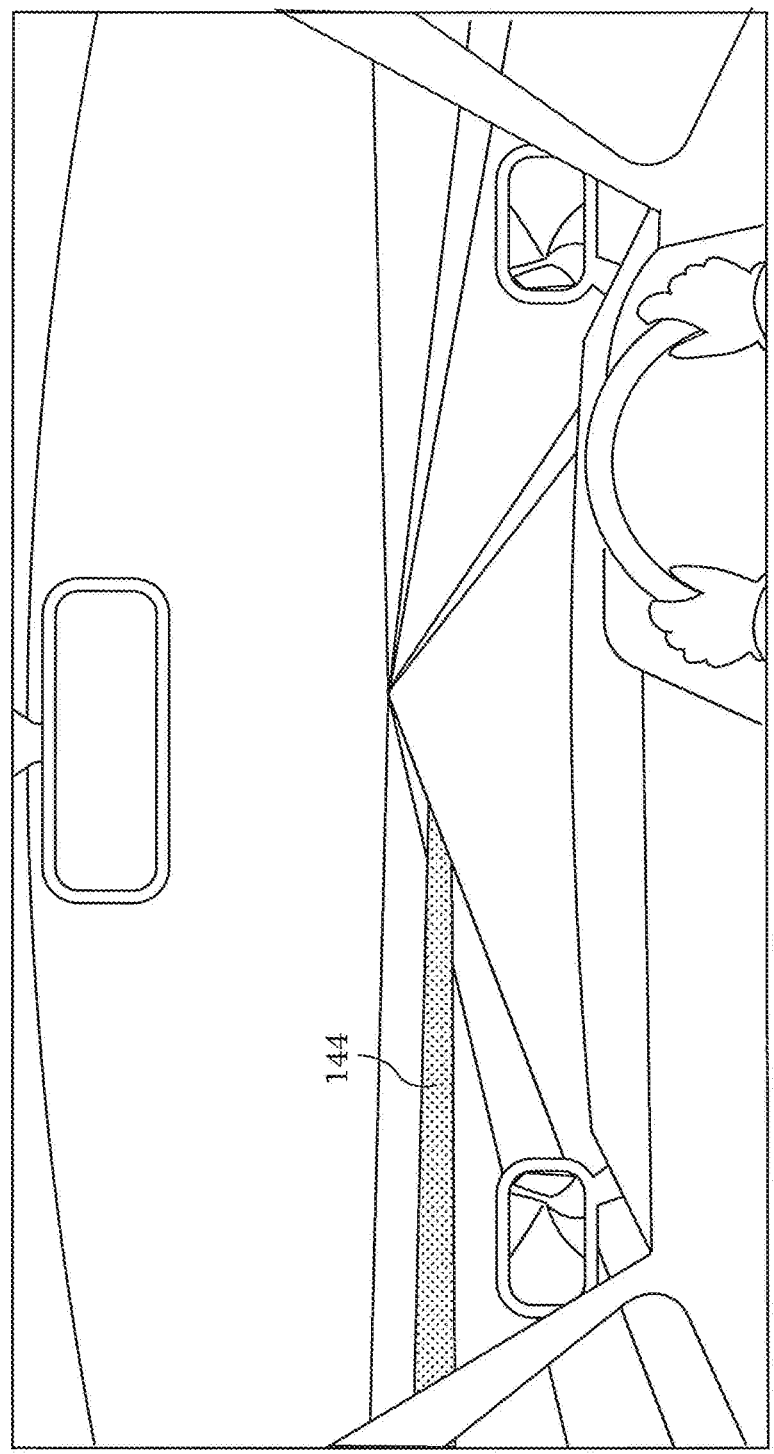
FIG. 9 is a diagram illustrating example 3 of the presentation information.

FIG. 9 is a diagram illustrating example 3 of the presentation information. In example 3, the presentation information is an image displayed on presentation device 20 which is a windshield or the like, using the AR, for example. As illustrated in FIG. 9, when the road included in the scene viewed through the windshield corresponds to a traveling route about which the mobile object has not completed learning, an image indicating that the mobile object has not completed the learning (for example, an image of a color which indicates that the learning model has not completed the learning) is displayed as presentation information 144 on the windshield such that the image is superimposed on the road. Accordingly, a user can intuitively learn the learning status of the road that the user can visually recognize.

As such, the presentation information may be an image presented using the AR.

Note that variations of the presentation information are not limited to the variations described in example 1 through example 3 above.

For example, the presentation information may be voice that reads the text indicated in presentation information 143. In this case, presentation device 20 includes a speaker, for example.

In addition, the presentation information may be a sign, for example. The sign indicates the learning status of the learning model, for example, and input required before the learning model completes learning is predetermined according to the sign. For example, a traveling route on which the sign of a cross is superimposed indicates that the number of times of manual driving of the mobile object required before the learning model completes learning about the traveling route is three times, and a traveling route on which the sign of a circle is superimposed indicates that the learning model has completed the learning.

In addition, for example, the presentation information may be a gauge image or the like which changes according to input required before the learning model completes the learning. For example, the length of a bar of histogram in the gauge image is set longer for lower values of the input required before the learning model completes the learning, and when the learning model completes the learning, the gauge image is filled with the histogram.

In addition, in the case of performing the learning for an occupant to stay comfortable during autonomous driving, the following two types of information may be distinguished to be presented: (i) presentation information which indicates input required before the learning model completes the learning without considering the comfortableness of the occupant in the mobile object during autonomous driving (hereinafter, referred to as a first presentation information), and (ii) presentation information which indicates input required before the learning model completes the learning which is performed in consideration of comfortableness of the occupant in the mobile object during autonomous driving (hereinafter, referred to as a second presentation information).

For example, a color used for each of a first presentation information and a second presentation information may be different. More specifically, when both the first presentation information and the second presentation information are used, variations of the color that indicate the learning status of the learning model increase. In addition, for example, a sign used for each of the first presentation information and the second presentation information may be different. More specifically, when both the first presentation information and the second presentation information are used, variations of the sign that indicate the learning status of the learning model increase. Furthermore, for example, the width of a gauge image used for each of the first presentation information and the second presentation information may be different. More specifically, when both the first presentation information and the second presentation information are used, the width of the gauge image that indicates the lemming status of the learning model increases. That is to say, the gauge image is not filled with a histogram by merely completing the learning just for autonomous driving, but the gauge image is filled with the histogram by also completing the learning for an occupant in the mobile object to stay comfortable during autonomous driving.

Note that although the presentation information is presented in response to an instruction from a user (for example, input or the like to an user interface included in information processing device 10), the presentation information may be automatically presented, for example, whenever there is a change in the progress in the learning.

Since input required before the learning model completes learning about a traveling route is presented according to the variance or the number of times the learning model learns about the traveling route, it is possible for the user to learn the learning status of the mobile object for autonomous driving.

[5. Cooperation with Another Mobile Object]

Note that the presentation information may be provided for another user different from a user of the mobile object.

Accordingly, the learning status of the mobile object can be notified to the other user of a mobile object for autonomous driving.

In addition, when the learning is not completed, trainer 12 may cause the learning model to learn operation performed on and/or movement made by another mobile object different from the mobile object, using, as input, the operation information and/or the traveling information obtained from the other mobile object, and the sensor data obtained from the other mobile object. For example, trainer 12 may determine, according to similarity between the input used for the mobile object and input used for the other mobile object, input to be used for training the learning model from among the input used for the other mobile object. More specifically, if there is a combination of the operation information and/or the traveling information obtained by the mobile object, and the sensor data obtained by the mobile object, which is similar to such a combination obtained by the other mobile object, the combination obtained by the other mobile object is to be used for training the mobile object.

In this manner, it is possible to use the operation information and/or the traveling information which is the input used for the other mobile object for training a mobile object to be trained, and the sensor data which is the input used for the other mobile object for training the mobile object to be trained. More specifically, by using input among the input used for the other mobile object which has close similarity with the input used for the mobile object to be trained, the input to be provided by a user can be set low. Also, the input required before the learning model completes the learning which is presented is set low.

As described above, a plurality of mobile objects may be trained in cooperation with one another.

[6. Conclusion]

As described above, manual driving of the mobile object along a traveling route allows the learning model to learn, according to surroundings around the mobile object which are indicated by the sensor data, operation to be performed on the mobile object and/or a route to be taken by the mobile object. Furthermore, since input required before the learning model completes learning about the traveling route is presented according to the variance or the number of times the learning model has learned about the traveling route in such a manner as described above, it is possible for a user to learn the learning status of the mobile object for autonomous driving. Consequently, the user is capable of providing input that is effective for learning.

Other Embodiment

As described above, information processing device 10 according to the present disclosure is described based on embodiments, but the present disclosure is not limited to the above embodiments. Various modifications to embodiments conceivable to those skilled in the art, as well as embodiments resulting from combinations of structural elements in different embodiments may be included within the scope of one or more aspects of the present disclosure, so long as they do not depart from the essence of the present disclosure.

For example, when information processing device 10 is realized by, for example, server devices, each of functional structural elements included in information processing device 10 may be separately included in each server device.

In addition, for example, when the mobile object recognizes, using the sensor data and the like, that the surroundings of a traveling route have been changed from the time when the learning model has learned about the traveling route while the mobile object is autonomously driving along the traveling route, the learning model may be updated using the latest sensor data and the like.

In addition, not only that the present disclosure can be realized as information processing device 10, but the present disclosure can also be realized as an information processing method including steps of processing to be performed by each of the structural elements which configures information processing device 10.

More specifically, as illustrated in FIG. 2, the information processing method includes: obtaining, from a mobile object, (i) at least one of operation information of the mobile object and traveling information indicating a traveling route taken by the mobile object, and (ii) sensor data obtained by sensing of the traveling route using a sensor included in the mobile object (step S11); causing a learning model to learn, using (i) the at least one of the operation information and the traveling information, and (ii) the sensor data as input, at least one of operation performed on and movement made by the mobile object using the sensor data obtained by sensing of the traveling route (step S12); generating, according to variance in at least one of the operation information used for learning the operation performed on the mobile object, the traveling information used for learning the movement made by the mobile object, and the sensor data, presentation information indicating the input required before the learning model completes learning about the traveling route (step S13); and causing presentation device 20 to present the presentation information (step S14).

In addition, for example, the steps may be executed by a computer (computer system). Moreover, the present disclosure can be realized as a program that causes a computer to execute the steps included in the method. Furthermore, the present disclosure can be realized as a non-transitory computer-readable recording medium, such as a CD-ROM.

For example, when the present disclosure is realized by a program, or in other words, software, each step is executed by running the program using hardware resources of a computer, such as a central processing unit (CPU), a memory, and an input-output circuit. That is to say, each step is executed using the CPU which computes data that the CPU is obtained from, for example, the memory or the input-output circuit, and outputs a computed result to, for example, the memory or the input-output circuit.

In addition, the structural elements included in information processing device 10 described in the above embodiments may be realized as dedicated circuits or general-purpose circuits. These structural elements may be realized as one circuit or a plurality of circuits.

Furthermore, the structural elements included in information processing device 10 described in the above embodiments may be realized as a large-scale integration (LSI) which is an integrated circuit (IC). These structural elements may be individually realized as one chip or may be realized as one chip including part or all of the structural elements. The LSI may be called a system LSI, a super LSI, or an ultra LSI by the difference in a degree of integration.

In addition, the IC may not be limited to the LSI and may be realized by a dedicated circuit or a general-purpose processor. A field programmable gate array (FPGA) that is programmable, or a reconfigurable processor that can reconfigure the connection of and the setting of circuit cells in the LSI may be used.

Furthermore, when another technique for integrating circuits which replaces the LSI as a result of advancement or a derivative from semiconductor technology appears, it is reasonable to use the technique to integrate each structural element included in information processing device 10 to realize an integrated circuit.

In addition, forms obtained by applying various modifications to the embodiments which may be conceived by a person skilled in the art, and forms achieved by optionally combining elements and functions in each embodiment, without departing from the scope of the present disclosure, are also included in the present disclosure.

Although only some exemplary embodiments of the present disclosure have been described in detail above, those skilled in the art will readily appreciate that many modifications are possible in the exemplary embodiments without materially departing from the novel teachings and advantages of the present disclosure. Accordingly, all such modifications are intended to be included within the scope of the present disclosure.

INDUSTRIAL APPLICABILITY

An aspect of the present disclosure can be used for an autonomous vehicle and the like, for example.

What is claimed is:
1. An information processing method, comprising:
obtaining, from a mobile object, (i) at least one of operation information of the mobile object and traveling information indicating a traveling route taken by the mobile object, and (ii) sensor data obtained by sensing of the traveling route using a sensor included in the mobile object;
causing a learning model to learn, using (i) the at least one of the operation information and the traveling information, and (ii) the sensor data as input, at least one of operation performed on and movement made by the mobile object using the sensor data obtained by sensing of the traveling route;
generating, according to a number of times the learning model is trained, presentation information indicating a number of times of learning required before the learning model completes learning about the traveling route; and
causing a presentation device to present the presentation information.
2. The information processing method according to claim 1, wherein
the number of times of learning required before the learning model completes the learning is set higher or not set lower for lower values of the number of times the learning model is trained, and
the number of times of learning required before the learning model completes the learning is set lower for higher values of the number of times the learning model is trained.
3. An information processing method, comprising:
obtaining, from a mobile object, (i) at least one of operation information of the mobile object and traveling information indicating a traveling route taken by the mobile object, and (ii) sensor data obtained by sensing of the traveling route using a sensor included in the mobile object;
causing a learning model to learn, using (i) the at least one of the operation information and the traveling information, and (ii) the sensor data as input, at least one of operation performed on and movement made by the mobile object using the sensor data obtained by sensing of the traveling route;
generating, according to variance in at least one of the operation information used for learning the operation performed on the mobile object, the traveling information used for learning the movement made by the mobile object, and the sensor data, presentation information indicating a number of times of learning required before the learning model completes learning about the traveling route; and
causing a presentation device to present the presentation information.
4. The information processing method according to claim 3, wherein
the number of times of learning required before the learning model completes the learning is set higher or not set lower for higher values of the variance, and
the number of times of learning required before the learning model completes the learning is set lower for lower values of the variance.
5. The information processing method according to claim 3, further comprising:
generating, when an area in which the variance is greater than or equal to a threshold is present, the presentation information indicating the number of times of learning required before the learning model completes the learning about the traveling route, according to a degree of adequacy of modeling a relationship between sensor data obtained in the area, and at least one of operation information and traveling information obtained in the area.

6. The information processing method according to claim 5, wherein
the number of times of learning required before the learning model completes the learning is set higher or not set lower for lower values of the degree of adequacy of modeling, and
the number of times of learning required before the learning model completes the learning is set lower for higher values of the degree of adequacy of modeling.

7. The information processing method according to claim 1, further comprising:
providing a user different from a user of the mobile object with the presentation information.

8. The information processing method according to claim 1, further comprising:
causing the learning model to learn, when the learning is not completed, at least one of operation performed on and movement made by the mobile object, using at least one of operation information and traveling information of an other mobile object different from the mobile object, and sensor data obtained by the other mobile object different from the mobile object as input.

9. The information processing method according to claim 8, further comprising:
determining, according to similarity between the input used for the mobile object and the input used for the other mobile object, input to be used for training the learning model from among the input used for the other mobile object.

10. An information processing device, comprising:
a processor; and
a non-transitory memory coupled to the processor,
wherein the processor:
obtains, from a mobile object, (i) at least one of operation information of the mobile object and traveling information indicating a traveling route taken by the mobile object, and (ii) sensor data obtained by sensing of the traveling route using a sensor included in the mobile object;
causes a learning model to learn, using (i) the at least one of the operation information and the traveling information, and (ii) the sensor data as input, at least one of operation performed on and movement made by the mobile object using the sensor data obtained by sensing of the traveling route;
generates, according to a number of times the learning model is trained, presentation information indicating a number of times of learning required before the learning model completes learning about the traveling route; and
causes a presentation device to present the presentation information.

11. An information processing device, comprising:
a processor; and
a non-transitory memory coupled to the processor,
wherein the processor:
obtains, from a mobile object, (i) at least one of operation information of the mobile object and traveling information indicating a traveling route taken by the mobile object, and (ii) sensor data obtained by sensing of the traveling route using a sensor included in the mobile object;
causes a learning model to learn, using (i) the at least one of the operation information and the traveling information, and (ii) the sensor data as input, at least one of operation performed on and movement made by the mobile object using the sensor data obtained by sensing of the traveling route;
generates, according to variance in at least one of the operation information used for learning the operation performed on the mobile object, the traveling information used for learning the movement made by the mobile object, and the sensor data, presentation information indicating a number of times of learning required before the learning model completes learning about the traveling route; and
causes a presentation device to present the presentation information.

* * * * *